July 27, 1926.
F. W. PICHÉ
1,593,949
BRAKE MECHANISM
Original Filed Feb. 9, 1924
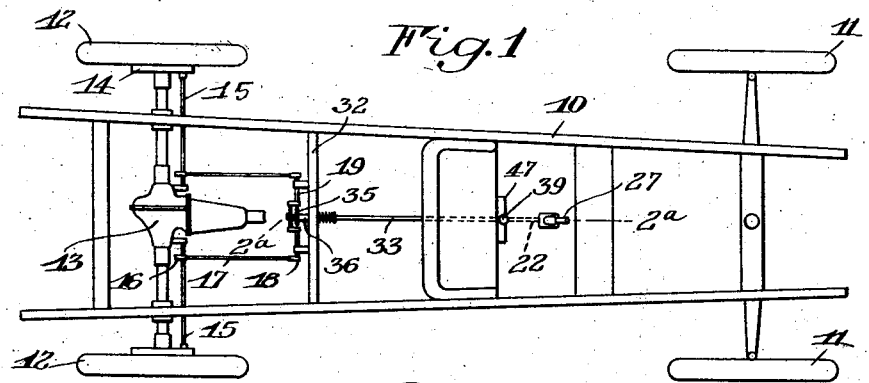
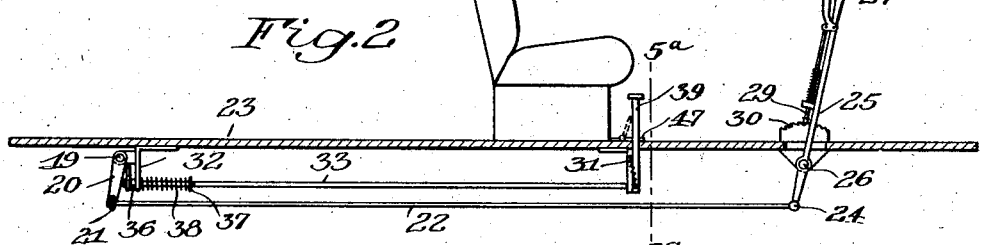
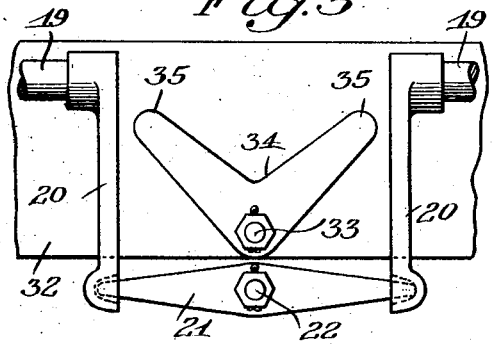 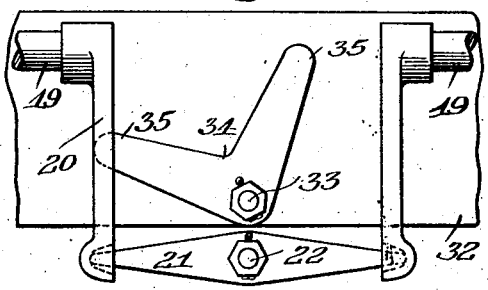
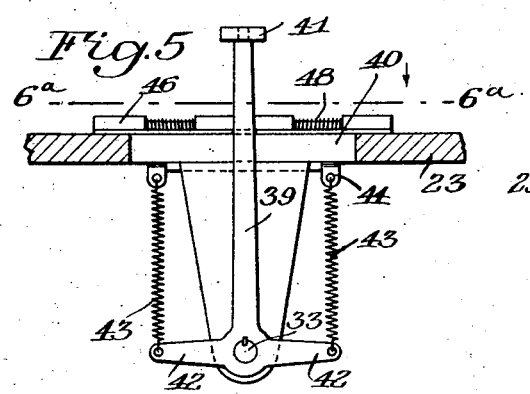
INVENTOR.
Frank W. Piché
BY
his ATTORNEY Patented July 27, 1926.

1,593,949

UNITED STATES PATENT OFFICE.

FRANK W. PICHÉ, OF DETROIT, MICHIGAN.

BRAKE MECHANISM.

Application filed February 9, 1924, Serial No. 691,546. Renewed November 27, 1925.

This invention relates to brake mechanism and more particularly to the variety capable of being operated selectively for braking one of a pair of vehicle traction members as useful, for example, where one of the members or wheels has lost effective tractive engagement with the ground. One object of the invention is to provide brake mechanism of the variety comprising means for equalizing the force applied to the brakes, with a simple and practical selective control mechanism of a character economical to install and convenient to operate. Another object is to provide a selective braking mechanism of the above character comprising safety means for returning the selective portion to neutral position and for releasably holding the latter in such position exclusively. To these and other ends the invention resides in certain improvements and combinations of parts all as will be hereinafter more fully described, the novel features being pointed out in the claims at the end of the specification.

In the drawings:

Figure 1 is a top plan view of a vehicle frame having the present invention applied thereto;

Fig. 2 is a sectional elevation on the line 2ª—2ª in Fig. 1;

Figs. 3 and 4 are enlarged rear elevations of a portion of the selective mechanism;

Fig. 5 is an enlarged section on the line 5ª—5ª in Fig. 2, and

Fig. 6 is an enlarged top plan view substantially as seen from the line 6ª—6ª in Fig. 5.

Similar reference numerals throughout the several views indicate the same parts.

The present invention is particularly applicable to brake mechanisms of the variety comprising an equalizing device for equalizing the forces applied to the individual brakes, as in various types of mechanisms now in use, for example, in motor vehicles. The invention is disclosed herein, by way of illustration, as applied to a common variety of automobile chassis comprising a body frame 10, (Figure 1) supported on a forward pair of wheels 11 and a pair of rear wheels 12 driven by differential gearing indicated generally at 13, as well understood in the art. The rear wheels are equipped with brake mechanisms indicated generally at 14 which may be of the usual or any suitable variety requiring no detailed description, each of which is operated by a transverse rock shaft 15. These shafts are rocked, as well understood in the art, through an arm 16 fixed on each and to which are pivotally connected rods 17 the forward ends of which are pivotally connected with respective arms 18 on corresponding short rockshafts 19 (Figure 2). Each of the latter has fixed thereon an arm 20 between which is located an actuating equalizer device such, for example, as a beam 21 the ends of which are engaged in sockets in the ends of the respective arms 20.

The equalizer beam 21 is loosely supported on the rear end of a rod 22 extending forwardly under the floor 23 of the vehicle and pivotally connected at 24 with the lower end of an operating means or lever 25. The latter is pivoted at 26 on a bracket under the floor and extends upwardly through an opening in the latter, being provided at its upper end with a handle 27 and a finger piece 28 operating a locking dog 29 engaging a tooth sector 30 for holding the brakes applied. The construction so far described is one well known in the art and operates when the lever 25 is pulled rearwardly to apply both brakes by force equalized by the action of the beam 21.

The present invention is combined with the braking mechanism described above for the purpose of variably eliminating the equalizing action of beam 21 to thereby actuate the brakes selectively and individually by the operating means or lever 25, for the purpose of concentrating the driving force in that one of the wheels having a good grip upon the ground. That is to say, should one of the wheels become ditched or otherwise lose its driving engagement with the ground, the present invention provides for applying the brake to such wheel alone to retard its rotation and divert the driving force into the other wheel to pull the vehicle out of its difficulty.

The selective mechanism preferably comprises an adjustable stop device for cooperation with the brake connections for obstructing the equalizing action of the brake beam 21 and thereby concentrating the braking force applied thereto in the other brake. To this end there is supported in bearings in transverse brackets 31 and 32, a rock shaft 33 the rear end of which extends rearwardly of bracket 32 and has fixed thereon a substantially L-shaped device or plate 34 having arms 35. This device is located as shown between the arms 20 of the braking mechanism which engage the ends of the equalizer beam and is so arranged and proportioned that in the neutral position shown in Figure 3, the braking mechanism is not engaged by the device 34 and hence is normally left free to operate in the usual manner. By rocking shaft 33, however, one or the other of the arms 35 is rocked in front of the corresponding arm 20 to prevent braking actuation thereof while leaving the other arm free. With the device 34 so adjusted, application of the braking force by means of lever 25 operates the disengaged arm 20 and applies the brake of the corresponding wheel exclusively. Vice versa, rocking of shaft 33 in the opposite direction and operation of lever 25 applies the other brake exclusively, so that either brake is applied at will and the other kept idle. The part 34 is provided with a hub or collar 36 (Figure 2) bearing against the stationary bracket 32 which thus serves as an abutment resisting the forward thrust of the arms 20. On the opposite side of the bracket, shaft 33 has fixed thereon a collar 37 between which and the bracket is a compression spring 38 coiled about the shaft to maintain the parts in position and prevent rattle.

The above described stop device is controlled by means conveniently located on the vehicle floor in front of and close to the driver's seat. To this end shaft 33 is extended forwardly to this point or in other words, forwardly of its supporting bracket 31, at which end it has fixed thereon a T-shaped member 39 (Figure 5) the standard of which extends upwardly through a transverse slot 40 in the floor and to a short distance above the latter to provide a handle 41 for operating this mechanism. The cross arms 42 of member 39 have attached thereto tension springs 43 secured at their upper ends to lugs 44 on bracket 31. It is apparent from this construction that while handle 41 is automatically returned by the springs upon release to the neutral central position of the parts shown in Figures 3 and 5, the handle may be conveniently rocked transversely of the vehicle and manually held in position to effect selective control of the brakes, as illustrated in Figure 4.

Means are preferably provided for positively holding handle 41 in neutral position, such means being also advantageously adapted for covering and closing the slot 40 in which handle 41 operates. This means comprises in the present instance a hinge-like device including a half portion 45 fixed to the floor and having hinged thereto at 46 a pivoted portion or cover plate 47 arranged to close slot 40 when swung downwardly against the floor as shown in Figure 6. Preferably, suitable spring means 48 are provided for moving cover 47 to this position. Cover 47 is formed with a recess 49 disposed to receive and positively hold handle 41 in its neutral position exclusively. By swinging cover 47 upwardly, the handle may be operated in either direction to apply either brake but the handle cannot be locked in either operating position, and is automatically returned upon release to neutral position in which position cover 47 closes and holds it and closes slot 40.

The operation of the mechanism has been described in connection with the above description of its construction and it is apparent that when it is desired to operate the brakes selectively the cover plate 47 may be quickly raised and handle 41 swung by hand or foot to one side or the other preparatory to applying one or the other of the brakes exclusively through the movement of the operating handle 27. By such adjustment one of the arms 35 is swung downwardly from the position of Figure 3 to that of Figure 4 to hold one of the arms 20 and thus eliminate the equalizing action of the beam 21 as the latter is drawn forwardly by pulling rearwardly on the brake handle 27. One or the other of the brakes is thus applied, as for example to retard the drive of a slipping wheel and concentrate the force in the other wheel. Upon release of handle 41 it is automatically returned by the spring means to neutral position and locked in such position by the fall of the cover plate 47. While the mechanism may thus be conveniently and quickly brought into operation for selective braking, it is disposed in an out-of-the-way position and normally positively held in neutral position to prevent inadvertent interference with the normal braking action.

The invention may obviously be applied not only in combination with the usual emergency hand brake operated by lever 25 as herein described, but also with a service brake operated by a pedal as in common use in some types of vehicles and the invention is applicable as well, of course, to other brake systems having an equalizing device connected in a suitable way so as to accomplish the desired result of affecting selective braking action. The exemplary embodiment herein disclosed is intended merely to illustrate one application of the above mentioned which has been found satisfactory in use, the invention being capable of various modifications within the scope of the appended claims.

I claim as my invention:

1. The combination with a vehicle having a pair of traction members, braking means for each of said members, and an operating means for said braking means connected therewith by an equalizer, of a device adapted to be adjustably positioned to selectively obstruct the operation of different portions of said equalizer and effect the selective braking of said traction members individually by said operating means.

2. The combination with a vehicle having a pair of traction members, braking means for each of said members, and an operating device for said braking means having an equalizing connection with the latter, of an adjustable stop device adapted to be positioned for variable cooperation with said equalizing connection to permit selective braking of said traction members individually by said operating device.

3. The combination with a vehicle having a pair of traction members, braking means for each of said members, and an operating means for said braking means having connections therewith comprising an equalizer beam, of an adjustable stop device adapted to be positioned for cooperation with said connections so as to obstruct the movement of either end of said beam and thereby effect selective braking of said traction members individually by said operating means.

4. The combination with a vehicle having a pair of traction members, braking means for each of said members, and an operating device for said braking means connected therewith by an equalizing part, of a pivoted device adapted to be swung to different positions for preventing the equalizing action of said part and permitting selective braking of said traction members individually by said operating device.

5. The combination with a vehicle having a pair of traction members, braking means for each of said members, and an operating means for said braking means having connections therewith comprising an equalizer beam, of a pivoted device adapted to be swung to different positions to prevent the equalizing action of said beam and effecting selective braking of said traction members individually by said operating means.

6. The combination with a vehicle having a pair of traction members, braking means for each of said members, and an operating device for said braking means having an equalizing connection with the latter, of an adjustable device adapted to be positioned for preventing the equalizing action of said connection and permitting selective braking of said traction members individually by said operating device, and mechanism for operating said adjustable device extending adjacent the driver's seat.

7. The combination with a vehicle having a pair of traction members, braking means for each of said members, and an operating means for said braking means having an equalizing connection with the latter, of a device adjustable from a neutral position to positions for selectively eliminating the equalizing action of said connection and effecting selective braking of said members individually by said operating means, and a holding device for said adjustable device cooperating with the latter exclusively in its neutral position.

8. The combination with a vehicle having a pair of differentially driven wheels, braking means for each of said wheels, and an operating means for said braking means having an equalizing connection with the latter, of a stop device adjustable from neutral to different positions for variably eliminating the equalizing action of said connection to effect selective braking of said wheels individually by said operating means, mechanism for adjusting said device extending adjacent the driver's seat, and a holding device for said mechanism cooperating therewith exclusively in the neutral position of said adjustable device.

9. The combination with a vehicle having a pair of differentially driven wheels, braking means for each of said wheels, and an operating means for said braking means having connections with the latter comprising an equalizer beam, of a rock shaft carrying stops adapted to be swung from a neutral position to positions for bringing one or the other of said stops into cooperation with said connections to prevent equalizing of said beam and selectively brake said wheels by said operating means, an arm on said shaft extending through a slot in the floor of said vehicle adjacent the driver's seat, spring means for returning said arm and shaft to neutral position and a plate movable to cover and uncover said slot having a recess for receiving and holding said arm in the neutral position of the latter when the plate is moved to cover the slot.

10. The combination with a vehicle having a pair of traction members, separate brake mechanisms, an equalizer operatively connected with said brake mechanisms, of means adjustable to prevent operation of either of said brake mechanisms by said equalizer while permitting operation of the opposite brake mechanism and actuating means for the equalizer.

11. In combination, a vehicle having a pair of traction members, a brake for each of said members, including release means, separate operating connections for said brakes, a common actuating member for said connections, a lever operatively connected with said actuating member, and disabling means movable to form a stop for either of said connections while permitting operation of the other by said lever and actuating member.

12. In combination, a vehicle having a pair of traction members, a brake for each of said members, individual operating connections for said brakes, each including an arm, an actuating member connected with said arms, an operating member connected with the actuating member for moving the latter to simultaneously apply said brakes, disabling means movable in the path of either of said arms to prevent effective operation thereof, a common actuating member for said disabling means and means adapted to return the disabling means to normal inoperative position.

13. In combination, a vehicle having a pair of traction members, a brake for each of said members, individual operating connections for said brakes, each including an arm, an actuating member having its ends operatively connected with said arms, a lever operatively connected with said actuating member to effect application of said brakes, and a manually controlled member movable to disable either of said arms while permitting operation of the other.

14. In combination, a vehicle having a pair of traction members, a brake for each of said members including release means, individual operating connections for said brakes, a lever operatively associated with said connections to effect application of the brakes, and disabling means mounted independent of said lever and movable to disable either of the connections while permitting operation of the other by said lever.

15. In combination, a vehicle having a pair of traction members, a brake for each of said members including release means, individual operating connections for said brakes, a common actuating member for said connections, manually controlled means for moving said actuating member to brake applying position, and disabling means mounted independent of said manually controlled means for rendering ineffective either of said connections while the other is operated to brake applying position.

16. In combination, a vehicle having a pair of traction members, a brake for each of said members including release means, individual operating connections for said brakes, a manually operable member associated with said connections for normally effecting simultaneous operation of the same, disabling means movable manually independently of said manually operable member to disable either of said connections while permitting operation of the other by said manually operable member, and means adapted to automatically return said disabling means to normal position upon release of the same.

FRANK W. PICHÉ.